United States Patent [19]

Lee

[11] Patent Number: 5,428,093
[45] Date of Patent: Jun. 27, 1995

[54] POLYETHYLENE BLEND COMPOSITIONS AND METHODS FOR MAKING SAME

[75] Inventor: Shau-Tarng Lee, Oakland, N.J.

[73] Assignee: Sealed Air Corporation, Saddle Brook, N.J.

[21] Appl. No.: 147,632

[22] Filed: Nov. 5, 1993

[51] Int. Cl.⁶ .......................... C08K 5/10; C08K 3/20; C08L 23/06

[52] U.S. Cl. .................................. 524/317; 524/312; 524/313; 524/430; 524/432; 524/515; 524/528; 525/240; 521/40.5; 521/41; 521/77; 521/79; 521/97

[58] Field of Search ............... 524/317, 528, 312, 313, 524/515, 430, 432; 525/240; 521/40.5, 41, 77, 79, 97

[56] References Cited

U.S. PATENT DOCUMENTS

| | | | |
|---|---|---|---|
| 3,644,230 | 2/1972 | Cronin | 524/317 |
| 4,824,912 | 4/1989 | Su | 525/240 |
| 5,030,662 | 7/1991 | Banerjie | 521/140 |
| 5,088,910 | 2/1992 | Goforth et al. | 425/142 |
| 5,096,046 | 3/1992 | Goforth et al. | 198/604 |
| 5,102,955 | 4/1992 | Calabro et al. | 525/240 |
| 5,290,822 | 3/1994 | Rogers et al. | 521/79 |
| 5,314,924 | 5/1994 | Lee | 521/79 |

*Primary Examiner*—Paul R. Michl
*Assistant Examiner*—Alga Asinovsky
*Attorney, Agent, or Firm*—Bell, Seltzer, Park & Gibson

[57] ABSTRACT

There is disclosed an ethylene polymer composition including a low density ethylene polymer blended with from about 2.0% by weight to about 60.0% by weight of the total composition of a recycled high density ethylene polymer and a compatibilizer comprising from about 0.1% to about 1.5% by weight zinc oxide and about 0.1% to 2.0% by weight of glycerol monostearate. The polymer composition may also include a foaming agent is present in an amount from 5 to 30 parts per hundred. There is also provided a method for producing the ethylene polymer compositions.

17 Claims, No Drawings

POLYETHYLENE BLEND COMPOSITIONS AND METHODS FOR MAKING SAME

BACKGROUND OF THE INVENTION

(1) Field of the Invention

The present invention relates to blended ethylene polymer compositions and to methods for making them. More particularly, the present invention relates to ethylene polymer compositions of recycle high density polyethylene and low density polyethylene blended together with a compatabilizer and to methods for making the compositions.

(2) The Prior Art

Low density polyethylene resin is used for many purposes including the manufacture of foam products which were useful as cushioning materials and films for converting to packaging material, known as bubble wrap. Attempts have been made to incorporate a high density polyethylene, such as that obtained from recycling the high density polyethylene resins used to make milk jugs, into the low density polyethylene resins typically used to make the cushioning foams and packaging films. The efforts to blend high density polyethylene and low density polyethylene are hampered because the high density polyethylene has a significantly higher melting point temperature than the low density polyethylene.

It is known that the structural difference in polyethylenes results in notable property differences. For example, highly branched low density polyethylene has a melting point of about 108° C. versus about 130° C. for linear high density polyethylene. This difference causes processing difficulties and quality problems when cooling the high density polyethylene, which tends to solidify at a temperature above the low density polyethylene. This difficulty becomes more pronounced in the relatively low temperature foam manufacture. The necessary cooling brings melt temperature significantly below the high density polyethylene's melting point. The uneven solidification causes scale lines (known as fish scales) and irregular bumps on the final product.

In general, compatibility becomes critical when the level of high density polyethylene is close to 5% in foam manufacture and 15% for film manufacture. A common practice to improve compatibilization is to include linear low density polyethylene (LLDPE) into the compositions because LLDPE's long chain and short branching makes it a structurally sound buffer for the blend. However, LLDPE does not possess as good a melt strength as low density polyethylene and the associated heat generation and extrusion makes for a lower quality product. In cast film operation, for example, presence of linear low density polyethylene poses draw resonance concern as the result of insufficient branching, and the production speed is limited. In brief, linear low density polyethylene alone as a replacement for low density polyethylene when blending with a high polyethylene provides marginal overall benefit in foam as well as film operation.

As the desire for higher level of recycled resin in commodity plastics increases, lots of effort is being spent on upgrading processing and equipment to produce blended compositions containing the recycled resins. By way of example, U.S. Pat. Nos. 5,096,046 and 5,088,910 both to Goforth et al. disclose systems for producing synthetic wood products containing recycled polyethylene blended materials. The Goforth et al. patents recognize the compatibility problems created in mixing low density and high density polyethylenes together. Goforth et al. further recognize that compatibilizers may be added to polyethylene resins blends. Other prior art such as U.S. Pat. No. 5,090,662 to Banerjie discloses construction materials which include blends of recycle polymeric materials and the use of compatibilizers, such as ethylene-propylene-maleic anhydride copolymers, styrenemaleic anhydride and the like in minor amounts, to make better polyethylene blends.

It is therefore a general object of the present invention to provide a composition of high density polyethylene together with low density polyethylene suitable for making aesthetically appealing foam products for use as a cushioning materials and film products for use in the packaging industry.

It is another object of the present invention to provide a method for producing a polyethylene composition of low density polyethylene and recycled high density polyethylene by blending together with a compatibilizer.

Other objects, features and advantages of the invention will be apparent from the following detailed description of the invention as more fully described.

SUMMARY OF THE INVENTION

In accordance with these objects and the principles of this invention, there is provided an ethylene polymer composition of a low density ethylene polymer blended with from about 2.0% by weight to about 60.0% by weight of the total composition of a high density ethylene polymer and a compatibilizer comprising an effective amount of zinc oxide and glycerol monostearate. The high density ethylene polymer is normally from about 4.0% to about 30.0% by weight of the total composition.

It was surprisingly found that a compatibilizer of zinc oxide and glycerol monostearate, when used in combination, produces a blended polyethylene composition that may be formed into commercially appealing products, either as foamed cushioning material or as films for use in forming bubble wrap and the like. The compatibilizer combination is normally used in an amount from about 0.1% to about 1.5% by weight of zinc oxide and from about 0.1% to about 2.0% by weight of glycerol monostearate. The compatabilizer combination is preferably used in amounts from about 0.4% to about 0.8% by weight of zinc oxide and from about 0.6% to about 1.0% by weight of glycerol monostearate.

The method of the present invention includes blending high density recycled polyethylene, preferably a waste or recycle polyethylene, together with low density polyethylene and adding a compatabilizer combination of zinc oxide and glycerol monostearate to the composition. This additive system shows compatibilizing benefits on blending structurally different polyethylenes.

In one embodiment of this invention, a physical blowing agent is added to the blended composition to control the density. The blowing agent may be one of the conventional agents known to those skilled in the art and is added in an amount from about 5 to 30 parts per hundred parts of the total composition. Typical foaming agents include, for example, gases such as hydrocarbons, halogenated hydrocarbons and carbon dioxide. However, the preferred amount of foaming agent is from 10 to 20 parts per hundred parts. It has been found that when waste high density polyethylene is used to make cushioning foams up to 30%, preferably from 4% to 15%, of the high density polyethylene may be blended. In addition, foam cushioning material produced from the compositions are devoid of fish scales and bumps to form an aesthetically appealing products.

In another embodiment, the polymer composition is extruded or cast to form a film. When film is produced from the blended compositions, significant property improvements exist when the low density portion of the blend is a linear low density polyethylene in an amount up to about 60.0% by weight of the total composition. The blended ethylene polymer composition is processed, such as by extruding, molding or casting to form films having up to 100% increase in elongation and 50%–90% increase in transverse film strength over low density polyethylene alone.

DETAILED DESCRIPTION OF THE INVENTION

It has been found that the polyethylene blend compositions of the present invention may be formed by incorporating from about 2.0% by weight to about 60.0% by weight, preferably up to 15.0% by weight, high density waste or recycle polyethylene resin which may be extruded into foam and film products.

The polyethylene compositions are blended with a compatabilizer of zinc oxide and glycerol monostearate. The polyethylene compositions are blended with 0.1 to about 1.5% by weight of zinc oxide and 0.1% to about 2.0% by weight of glycerol monostearate. The preferred amount of zinc oxide in the compatabilizer is from about 0.4% by weight to about 0.8% by weight and the preferred amount of glycerol monostearate is from about 0.6% by weight to about 1.0% by weight. An example of a suitable glycerol monostearate is Atmer 129 made by ICI of Wilmington, Del. It was surprisingly found that the combination of zinc oxide and glycerol monostearate gave a smoother product and a film having better tensile strength and elongation than when either was used alone.

The waste or recycle high density polyethylene may come from any source but is preferably from recycled milk jug material. Although this invention is particularly suitable for using recycled high density polyethylene resins, it should be understood that virgin high density polyethylene may be used. To qualify as a recycle product, the product must incorporate at least 15% post consumer resin. Although milk jug resin is clean and readily available, the compatibility concern limits it level in low density polyethylene foam applications. The major sources of these material are so-called "clean plastics waste" obtained from municipal, residential or industrial waste. Since these material have been processed in their initial application or applications and exposed, often for lengthy periods, to the environment, they have different physical and chemical properties from virgin material. Generally, the waste plastics have substantially lower tensile strength and poor flex and thermal properties, as compared to virgin plastics.

The high density polyethylene has a density of greater than approximately 0.94 g/cc, measured in accordance with ASTM D1505, and a MI of less than approximately 1.0 g/10 minutes, measured in accordance with ASTM D 1238, Condition 190/2.16. An example of such typical material is EC-101 post consumer recycled high density polyethylene, available from Quantum Chemicals of Cincinnati, Ohio.

The low density polyethylene has density of less than approximately 0.92 g/cc, measured in accordance with ASTM D1505, and a MI of greater than approximately 1.0 g/10 minutes, measured in accordance with ASTM D1238, Condition 190/2.16. As an example of low density polyethylene is one available from Novacor of Calgary, Canada.

Depending on the use of products made from the ethylene blend compositions of this invention, the compositions may have added thereto ultraviolet absorbers, viscosity stabilizers, lubricants, antistatic agents, coloring agents and antifungal agents.

The compositions of this invention can be prepared by mixing the various components in a conventional blender, e.g., a tumble blender, a ribbon blender, or a Henschel-type mixer. Compounding can be done in machines such as a twin-screw extruder or a continuous mixer/single screw extruder combination. Thereafter, pelletizing the extrudate strands can be done in a conventional pelletizer. The pellets thus produced can be extruded into a specific structural profile by a single-screw extruder with a profile dies using appropriate downstream take-off equipment. In addition to extrusion, the composition of this invention may be injection molded or casted to produce commercially usable products.

The selection of the appropriate operating conditions may be readily determined by those skilled in the art. Generally, processing temperatures of from 100° C. to about 250° C. are used.

In foam manufacture, presence of low percentages of linear low density polyethylene provides some benefits. However, the benefits diminish rapidly as the total level of high density polyethylene linear low density polyethylene exceeds about 10% because of the high melt temperatures. To control the density of the structured profile product, a blowing agent may be added to the compounded pellets, preferably in an amount from about 5 to 30 parts per hundred parts of the total composition. However, the most preferred amount is from 10 to 20 parts per hundred parts.

The present innovative technology has been developed to reprocess used plastic high density milk containers into new and different types of commercial products. These products have excellent surface appearance and physical properties. When in need of replacement, the products may be further recycled using the present technology.

The properties of the polymers produced in the Examples and any calculated process parameters were determined by the following test methods:

Density: ASTM Method D-1505

Melt Index: ASTM Method D-1238

The present invention is further illustrated by the following examples.

EXAMPLE 1

The efficacy of the compatibilizer combination of this invention was carried out by preparing four compositions which included dry blending together 15% post consumer high density milk jug resin with low density polyethylene and a compatibilizer. In each sample glycerol monostearate (GMS) was added and in two of the samples zinc oxide (ZnO) was also added as the compatabilizer. The resins and compatabilizers were passed through a 65 mm counter rotating twin screw pilot extruder. Even though this resin had a low MI of 0.46, the same processing profile as LDPE foam was maintained.

TABLE 1

15% PCR-HDPE Pilot Foam Trial Results

| Sample # | ZnO % | GMS % | Melt T. °F. | Gauge inch | Density PCF | Surface |
|---|---|---|---|---|---|---|
| 1 | — | 0.9 | 239 | .106–.024* | >3.2 | Very rough** |
| 2 | - | 0.9 | 239 | .118–0.47* | >3.7 | Rough* |
| 3 | .33 | 0.9 | 244 | .116 | 3.4 | Smooth |
| 4 | .33 | 0.9 | 244 | .156 | 2.45 | Smooth |

*Cross direction valley-high (not machine direction)
**Clear thick fish scale lines.

In a sample without compatabilizer, the melt temperature rise and compatibility became unacceptable as the level of PCR-high density polyethylene level is close to 5.%. Also, irregular bumps, fish scale lines and thinner sheet appeared as HDPE level increased.

Even though melt temperature rise was associated with HDPE, the foam dimensional stability was under control, partly because the cell wall strength was enhanced by the presence of crystalline HDPE. Cloudiness was also noted with the addition of ZnO. For foam, it is not a general concern, because of its opaque nature.

The addition of either ZnO or GMS alone only showed marginal improvement over no additives. However, as shown by samples #3 and #4, the presence of both resulted in a smooth film.

EXAMPLE 2

In this example, additional samples were made and tested from a base formula containing 15% post consumer milk jug HDPE and 85% LDPE or 80% if 5% of LLDPE was present. The 36 grams of zinc oxide (ZnO) added corresponds to 1.0% by weight of the total resin. The glycerol monostearate corresponds to 1.2% by weight of the total resin.

TABLE 2

Formulas with 15% PCR-HDPE

| Sample | LDPE, lb | LLDPE, lb | PCR-HDPE*, lb | GMS, gm | ZnO, gm |
|---|---|---|---|---|---|
| A | 8.5 | — | 1.5 | — | — |
| B | 8.5 | — | 1.5 | 45 | — |
| C | 8.5 | — | 1.5 | — | 36 |
| D | 8.5 | — | 1.5 | 45 | 36 |
| E | 8.0 | 0.5 | 1.5 | 45 | 36 |

*PCR-HDPE is EC-101 from Quantum Chemicals.

Various formulas as indicated in Table 2 were compounded and pelletized on a single screw repro extruder. The pellet samples were blown-filmed on a 1" pilot extruder. Besides visual gel check, films were subject to instron tensile and elongation tests.

TABLE 3

Strength Test Results with 15% PCR-HDPE

| Sample | Gauge, in | Tensile, psi | Elongation, % |
|---|---|---|---|
| *a) Machine Direction* | | | |
| Control* | .0016 | 3250 | 115 |
| A | .0017 | 4117 | 140 |
| B | .00165 | 3830 | 125 |
| C | .00165 | 3539 | 132.5 |
| D | .00185 | 3416 | 135 |
| E | .00165 | 3212 | 110 |
| *b) Transverse Direction* | | | |
| Control* | .0017 | 1529 | 375 |
| A | .00145 | 1655 | 375 |
| B | .0014 | 2071 | 450 |
| C | .00145 | 2137 | 475 |

TABLE 3-continued

Strength Test Results with 15% PCR-HDPE

| Sample | Gauge, in | Tensile, psi | Elongation, % |
|---|---|---|---|
| D | .00145 | 2413 | 562.5 |
| E | .00145 | 2068 | 462.5 |

Note: *Control sample is pure LDPE resin.

Gel is a direct reflection of resin quality. Compatibility is more appropriately indicated by elongation and strength results. As shown in Table 3, obvious improvement of strength and elongation on the transverse direction is attributed to better cohesiveness between different polymer strands. Small percentage of LLDPE (see Sample E) also helps somewhat, probably because of its intermediate structure.

EXAMPLE 3

Through the same procedure, more recipes as shown in Table 4 were prepared with 50% or higher LLDPE.

TABLE 4

Formulas With High Level LLDPE

| Component | A2 | B2* | C2* | D2** | E2** |
|---|---|---|---|---|---|
| LLDPE, # | 7 | 5 | 5 | 6 | 6 |
| LDPE, # | 3 | 3.5 | 3.5 | 3.0 | 2.5 |
| HDPE, # | — | 1.5 | 1.5 | 1.0 | 1.5 |
| GMS, gm | — | — | 36 | 36 | 36 |
| ZnO, gm | — | — | 27 | 27 | 27 |

Notes:
*HDPE resins are post consumer milk jug recycled resins, EC-101 from Quantum Chemicals
**HDPE resins are post consumer milk jug recycled resins from Union Carbide.

TABLE 5

Test Results for High Level LLDPE

| Sample | Gauge, in. | Tensile, psi | Elongation % | Direction |
|---|---|---|---|---|
| A2 | | | 175 | MD |
| | .0012 | 4166 | 150 | MD |
| | .0015 | 4106 | 750 | TD |
| | .0014 | 2714 | 650 | TD |
| B2 | .0014 | 2742 | | |
| | .0012 | 3500 | 125 | MD |
| | .0016 | 3675 | 125 | MD |
| | .0014 | 1658 | 300 | TD |
| | .0015 | 1493 | 310 | TD |
| C2 | .0012 | 3333 | 175 | MD |
| | .0016 | 3275 | 175 | MD |
| | .0015 | 2426 | 600 | TD |
| | .0015 | 2373 | 560 | TD |
| D2 | .0016 | 2850 | 350 | MD |
| | .0012 | 3600 | 350 | MD |
| | .0018 | 2622 | 600 | TD |
| | .0021 | 2476 | 650 | TD |
| E2 | .0019 | 2547 | 325 | MD |
| | .0014 | — | 325 | MD |
| | .0012 | 3266 | 600 | TD |
| | .0012 | 3133 | 575 | TD |

Note: E2 has the least gels, B2 and C2 in the next rank, D2 has more gels, and A2 the most.

As for film test results tabulated in Table 5, sample B2 has a lot less gel than sample A2. But substantial improvement in the property with the additive system is observed between B2 and C2. That means that synergism still holds at higher percentage of LLDPE. It should be pointed out that film properties vary as the proportion of the resins varies. An increase of LLDPE favors compatibility, since its structure difference from either LDPE or HDPE is minimum.

The invention has been described in detail with particular reference to a preferred embodiment and the operation thereof, but it is understood that variations, modifications, and the substitution of equivalent means can be effected within the spirit and scope of this invention.

What is claimed is:

1. A blended ethylene polymer composition which is processable into a product comprising: a low density ethylene polymer; from about 2.0% by weight to about 60.0% by weight of a high density ethylene polymer; and an effective amount of a compatibilizer comprising zinc oxide and glycerol monostearate, said composition after processing forming an aesthetically appealing product.

2. The blended polymer composition according to claim 1 wherein said high density polyethylene is a waste material and is present in said composition in an amount of from about 4.0% by weight to about 30.0% by weight of the total composition.

3. The blended polymer composition according to claim 1 wherein said low density polyethylene portion of said composition contains up to about 60.0% by weight of a linear low density polyethylene.

4. The blended polymer composition according to claim 2 wherein a blowing agent is present in an amount from 5 to 30 parts per hundred.

5. The blended polymer composition according to claim 1 wherein the zinc oxide in said compatibilizer is present in an amount from about 0.1% to about 1.5% by weight.

6. The blended polymer composition according to claim 1 wherein the glycerol monostearate in said compatabilizer is present in an amount from about 0.1% to about 2.0% by weight.

7. The blended polymer composition according to claim 1 wherein said compatibilizer comprises from about 0.4% to about 0.8% by weight zinc oxide and from about 0.6% to about 1.0% by weight of glycerol monostearate.

8. A blended ethylene polymer composition which is processable in to product comprising: a low density ethylene polymer; from about 4.0% by weight to about 30.0% by weight of a recycled high density ethylene polymer; and a compatibilizer comprising from about 0.4% to about 0.8% by weight zinc oxide and about 0.6% to about 1.0% by weight of glycerol monostearate, said composition after processing forming an aesthetically appealing product.

9. The blended polymer composition according to claim 8 wherein a blowing agent is present in an amount from 10 to 20 parts per hundred.

10. A method for producing a blended ethylene polymer composition of low density polyethylene and high density polyethylene comprising of the steps of:
blending together low density polyethylene and from about 2.0% by weight to about 60.0% by weight of the total composition of high density polyethylene; and
adding to said blend an effective amount of a compatibilizer comprising zinc oxide and glycerol monostearate.

11. The method according to claim 10 wherein said high density polyethylene is a waste material and is present in an amount of 4.0% by weight to about 30.0% by weight of the total composition.

12. The method according to claim 10 wherein said low density polyethylene portion of said composition contains up to about 60.0% by weight of a linear low density polyethylene.

13. The method according to claim 10 further comprising adding a foaming agent to said blending step in an amount from 5 to 30 parts per hundred.

14. The method according to claim 10 wherein the zinc oxide portion of said compatibilizer is from about 0.1% to 1.5% by weight zinc oxide.

15. The method according to claim 10 wherein said the glycerol monostearate portion of said compatibilizer is from about 0.1% to about 2.0% by weight of glycerol monostearate.

16. A method for producing a product from an ethylene polymer blend composition which is extrudable comprising: blending a low density ethylene polymer with from about 4.0% by weight to about 15.0% by weight of the total composition of a recycled high density ethylene polymer; and adding to said composition a compatibilizer comprising from about 0.4% to about 0.8% by weight zinc oxide and about 0.6 to about 1.0% by weight of glycerol monostearate; and extruding said polymer composition to form an aesthetically appealing product.

17. The method according to claim 16 further comprising, adding to said composition a foaming agent in an amount from 5 to 30 parts per hundred.

* * * * *

UNITED STATES PATENT AND TRADEMARK OFFICE
CERTIFICATE OF CORRECTION

PATENT NO. : 5,428,093

DATED : June 27, 1995

INVENTOR(S) : Shau-Tarng Lee

It is certified that error appears in the above-identified patent and that said Letters Patent is hereby corrected as shown below:

On the Title page, Abstract, line 9, after "agent" insert -- which --.

Col. 1, line 12; Col. 2, lines 44, 47 and 54; Col. 3, lines 28 and 32; Col. 4, lines 63, 65-66, and 66; Col. 5, line 15; and Col. 7, line 34, "compatabilizer" should be -- compatibilizer --.

Col. 1, line 10; Col. 2, lines 7 and 53; Col. 3, lines 25, 42 and 47-48, "recycle" should be -- recycled --.

Col. 2, line 15; "materials" should be -- material --.

Col. 2, line 5, "5,090,662" should be -- 5,030,662 --.

In Col. 3, line 6, "products" should be -- product --.

Col. 4, line 22, "dies" should be -- die --.

Col. 5, line 18, omit the period (.) between "5" and "%".

Col. 6, Table 5, 4th and 5th columns, first 4 rows, should be moved down.

Col. 7, line 42, delete "in to" and insert -- into a -- therefor.

UNITED STATES PATENT AND TRADEMARK OFFICE
CERTIFICATE OF CORRECTION

PATENT NO. : 5,428,093

DATED : June 27, 1995

INVENTOR(S) : Shau-Tarng Lee

It is certified that error appears in the above-identified patent and that said Letters Patent is hereby corrected as shown below:

Col. 8, line 8, after "comprising" omit -- of --.

Col. 8, line 31, omit -- the --.

Col. 8, line 46, before "adding" omit the comma (,).

Signed and Sealed this

Ninth Day of July, 1996

BRUCE LEHMAN

*Attest:*

*Attesting Officer*  *Commissioner of Patents and Trademarks*